United States Patent
Shor et al.

(10) Patent No.: US 11,538,061 B2
(45) Date of Patent: Dec. 27, 2022

(54) SYSTEM AND PROCESS TO CREATE A LOOKALIKE MODEL FOR A TARGET AUDIENCE TO DELIVER ADVERTISEMENTS

(71) Applicant: Civis Analytics, Inc., Chicago, IL (US)

(72) Inventors: David Shor, Chicago, IL (US);
Stephen Hoover, Chicago, IL (US);
Caitlin Malone, Chicago, IL (US);
Michael Sadowsky, Chicago, IL (US);
Zachary Krislov, Washington, DC (US); Evan Sadler, Chicago, IL (US)

(73) Assignee: Civis Analytics, Inc., Chicago, IL (US)

( * ) Notice: Subject to any disclaimer, the term of this patent is extended or adjusted under 35 U.S.C. 154(b) by 0 days.

(21) Appl. No.: 16/214,560

(22) Filed: Dec. 10, 2018

(65) Prior Publication Data

US 2020/0184510 A1 Jun. 11, 2020

(51) Int. Cl.
*G06Q 30/02* (2012.01)
*G06N 20/00* (2019.01)

(52) U.S. Cl.
CPC ......... *G06Q 30/0245* (2013.01); *G06N 20/00* (2019.01); *G06Q 30/0269* (2013.01)

(58) Field of Classification Search
CPC .................................................... G06Q 30/02
See application file for complete search history.

(56) References Cited

U.S. PATENT DOCUMENTS

| | | | | |
|---|---|---|---|---|
| 2002/0046120 A1* | 4/2002 | Collins | .............. | G06Q 30/0235 705/14.19 |
| 2002/0138333 A1* | 9/2002 | DeCotiis | .............. | G06Q 10/067 705/7.32 |
| 2002/0198786 A1* | 12/2002 | Tripp | .................. | G06Q 30/0601 705/26.1 |
| 2005/0091111 A1* | 4/2005 | Green | ................ | G06Q 30/0262 705/14.59 |
| 2009/0070129 A1* | 3/2009 | Inbar | ...................... | G06Q 30/02 705/317 |
| 2009/0254971 A1* | 10/2009 | Herz | ................... | G06Q 30/0603 726/1 |
| 2010/0114665 A1* | 5/2010 | Stengard | ............... | G06F 16/214 705/7.33 |

(Continued)

OTHER PUBLICATIONS

Lewis, R. A., & Reiley, D. H. (2014). Advertising effectively influences older users: How field experiments can improve measurement and targeting. Review of Industrial Organization, 44(2), 147-159. doi:http://dx.doi.org/10.1007/s11151-013-9403-y (Year: 2014).*

(Continued)

*Primary Examiner* — Vincent M Cao
(74) *Attorney, Agent, or Firm* — Goodwin Procter LLP

(57) ABSTRACT

A system and process to create a lookalike model for a target audience to deliver advertisements are disclosed. According to one embodiment, the method comprises selecting survey data from a survey database that relates to an advertisement. A heterogenous treatment effect (HETE) model is trained on the survey data. Persuadable customers are identified from the survey database for the advertisement based on the HETE model. An optimized customer list is generated using personally identifiable information.

18 Claims, 3 Drawing Sheets

(56) References Cited

U.S. PATENT DOCUMENTS

| | | | |
|---|---|---|---|
| 2012/0054027 A1* | 3/2012 | McAfee | G06Q 30/0251 |
| | | | 705/14.49 |
| 2013/0124298 A1* | 5/2013 | Li | G06Q 30/0241 |
| | | | 705/14.42 |
| 2014/0278796 A1* | 9/2014 | Arini | G06Q 30/0204 |
| | | | 705/7.33 |
| 2015/0066594 A1 | 3/2015 | Li et al. | |
| 2015/0332156 A1* | 11/2015 | Pliner | G05B 13/048 |
| | | | 706/52 |
| 2017/0111461 A1* | 4/2017 | Kelman | G06Q 30/02 |
| 2017/0178199 A1 | 6/2017 | Cessna et al. | |

OTHER PUBLICATIONS

International Search Report and Written Opinion of the International Searching Authority, in Application No. PCT/US/2019/65291, dated Feb. 21, 2020.

\* cited by examiner

SYSTEM AND PROCESS TO CREATE A LOOKALIKE MODEL FOR A TARGET AUDIENCE TO DELIVER ADVERTISEMENTS

FIELD

The present disclosure relates in general to the field of computer software and systems, and in particular, to a system and process to create a lookalike model for a target audience to deliver advertisements.

BACKGROUND

Networking websites have become highly prevalent with the ability of the Internet to connect people from all over the world. These networking websites offer advertisements to their users. In order to improve advertising on networking websites, the networking websites allow advertisers to target particular demographics within their user community.

A lookalike audience is a way to reach new people who are likely to be interested in a particular business' advertising because the lookalike audience is similar to the advertiser's best existing customers. When an advertiser creates a lookalike audience, the advertiser chooses a source audience (e.g., a list of persons drawn from, for example pixel data, mobile app data or fans of the advertiser's networking webpage).

Networking websites then identify the common qualities of the people in the lookalike audience (ex: demographic information or interests). They find people in their community who are similar to (or "look like") the lookalike audience.

An advertiser can choose the size of a lookalike audience and possibly a country during the creation process. Smaller audiences more closely match the source audience. Creating a larger audience increases an advertiser's potential reach, but reduces the level of similarity between the lookalike audience and the source audience. An advertiser can select countries for its lookalike audiences. Multiple lookalike audiences may be generated from a single source audience. Multiple lookalike audiences may be used at the same time for a single ad set.

Advertisers, however, have struggled in identifying the best source audience as a foundation for their lookalike audiences resulting in ineffective and costly advertising.

SUMMARY

A system and process to create a lookalike model for a target audience to deliver advertisements are disclosed. According to one embodiment, the method comprises selecting survey data from a survey database that relates to an advertisement. A heterogenous treatment effect (HETE) model is trained on the survey data. Persuadable customers are identified from the survey database for the advertisement based on the HETE model. An optimized customer list is generated using personally identifiable information.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
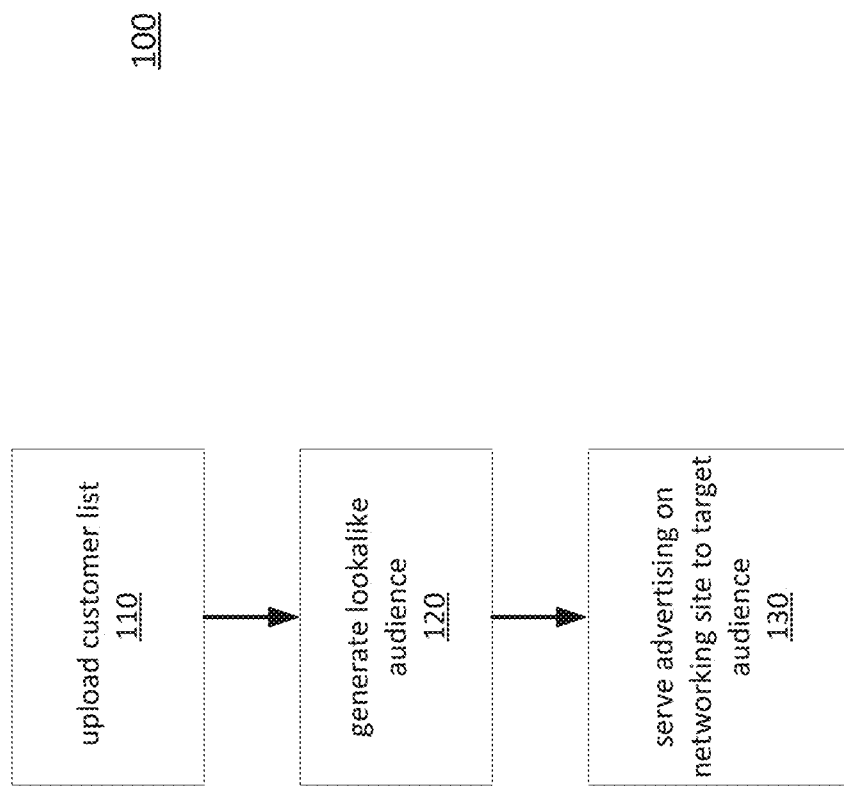
FIG. 1 illustrates a targeted advertising process as commonly used with networking platforms.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A system and process to create a lookalike model for a target audience to deliver advertisements are disclosed. According to one embodiment, the method comprises selecting survey data from a survey database that relates to an advertisement. A heterogenous treatment effect (HETE) model is trained on the survey data. Persuadable customers are identified from the survey database for the advertisement based on the HETE model. An optimized customer list is generated using personally identifiable information.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a targeted advertising process 100 as commonly used with networking sites. Generally, an advertiser (e.g., a retail store, a movie theater chain, a restaurant, etc.) collects information about its customers. The advertiser may have customer information, such as customer e-mail addresses, phone numbers, first name, last name, zip codes, city, state, country, date of birth, year of birth, gender, age, mobile advertising ID and a universal ID. This information may have been gathered through a loyalty program, or a registration process.

The advertiser generates a list having some or all of its customer information and uploads it to a networking website (e.g., a social networking website, a business networking website, a dating website, etc.) through the networking website's application programming interface (API). (110) The customer information sent to the networking website might be a list of the advertiser's best customers. Once the networking website receives the customer information, it uses the customer information as a source audience to generate a lookalike audience. (120) The networking website then serves the advertiser's advertising on the lookalike audience as its target audience (e.g., members of the networking website) most similar to the customer list. (130)

Figure 2:
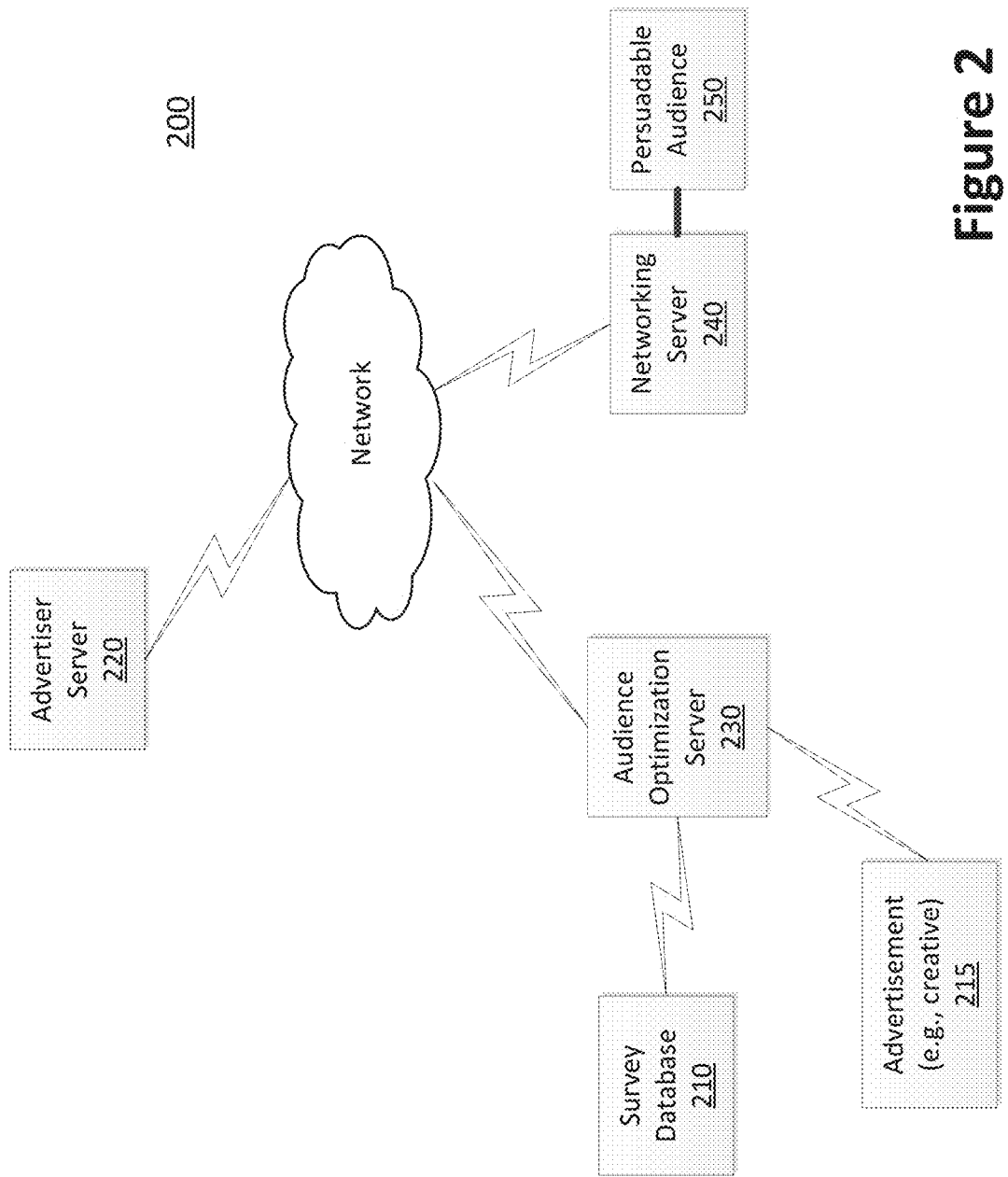
FIG. 2 illustrates an exemplary targeting system architecture that optimizes target audiences, according to one embodiment.

FIG. 2 illustrates an exemplary targeting system architecture 200 that optimizes target audiences, according to one embodiment. The purpose of targeting system 200 is to create a lookalike model which will direct advertisements to networking website users who will be most persuaded by them. Targeting system 200 creates a lookalike model by training a heterogeneous treatment effects (HETE) model on survey experiment data and using that model to estimate treatment effects for individuals in a database of survey takers.

The survey experiment data may include answers to a number of questions that are predictive of a user's persuadability (e.g., age, gender, political beliefs, education, and so forth referred to as predictor questions). The survey shows the survey taker either the advertisement for targeting, or an unrelated advertisement (e.g., a public service announcement about being polite on the subway). The survey asks if the survey taker is likely to take the action of interest in the near future (e.g. "How likely are you to purchase product X in the next month?" known as the final question). The answers to the predictor questions and differences in the final question between groups, predict if survey takers are persuaded by the advertisement.

Specifically, audience optimization server 230 trains the HETE model using survey experiment data stored in survey database 210 and customer information from advertiser server 220. A heterogenous treatment effect (HETE) model is a class of supervised machine learning model intended to estimate the probability that an individual would be influenced by some treatment, as determined by unique characteristics of that individual.

Survey database 210 collects information about survey takers such as their e-mail addresses, phone numbers, first name last name, zip codes, city, state, country, date of birth, year of birth, gender, age, mobile advertising ID and a universal ID. Survey database 210 may also collect information, such as purchase history and other data about customer purchases including price and date.

Targeting system 200 also includes an advertiser server 220, where the advertiser server 220 includes advertisements for testing. Targeting system 200 also includes networking server 240 that provides a networking website (e.g., social or business networking platform) that serves advertising for the advertiser based on the optimized customer information generated by audience optimization server 230.

Targeting system 200 generates a list of most persuadable persons 250 on the networking server 240. Targeting system 200 is superior to prior systems as reflected in FIG. 1 that generate audiences that can only be customized by the information that people volunteer (e.g., this might include someone's likes of content on the networking website or networking website pages they subscribe to). Targeting system 200 determines the type of messaging that is likely to persuade a user of the networking website. A network (e.g., Internet, wireless, etc.) connects all the individual components of targeting system 200. Audience optimization server 230 determines optimized customer information that is used by networking server 240 to determine the persuadable audience 250. The persuadable audience 250 is a subset of users of the networking website to whom the advertiser will target advertisements more effectively because the audience is more persuadable.

To optimize an advertisement, instead of only which people, a survey experiment is run with several different treatment groups—e.g., group 1 sees the ad with the unicorn, group 2 sees the ad with the beach, group 3 sees the ad with the mountain climbers, and group 4 sees the PSA (the control). Determining which advertisements a person finds most persuasive can be done in two ways. First, with answers to direct questions asked on the survey itself (e.g., "If you could, would you like to run away from it all and live on a sailboat?"). Direct questions tend to be most predictive. Second, enough PII is provided that a survey taker can be identified in other data (e.g., national consumer file), and use data or models from that.

Audience optimization server 230 uses HETE modeling to correctly rank-order individuals by treatment effect. (e.g., the output scores are such that if individual A has a higher score than individual B, then individual A should have a larger probability of responding to treatment than individual B.)

Audience optimization server 230 takes a list of the most persuadable survey respondents from the survey database 210, appends their personally identifiable information to it (e.g., e-mail addresses and names received from survey takers directly), and uploads it to the networking server 240 using its API. In alternate embodiments, this upload may also be manual—e.g., someone sending a file of names and telephone numbers through the service's GUI. Advertisers may then instruct networking server 240 to build a lookalike model off that seed list of people (e.g., optimized customer information), and find more people on the networking platform that look like the persuadable targets (e.g., persuadable audience 250) and advertise to them.

Audience optimization server 230 allows on an individual basis, to know who (e.g., which of the advertiser's customers) is most likely to be persuaded by which message. Sometimes the most popular message overall is less effective, or even counterproductive, for certain sub-populations and audience optimization server 230 uses HETE modeling to predict that.

Figure 3:
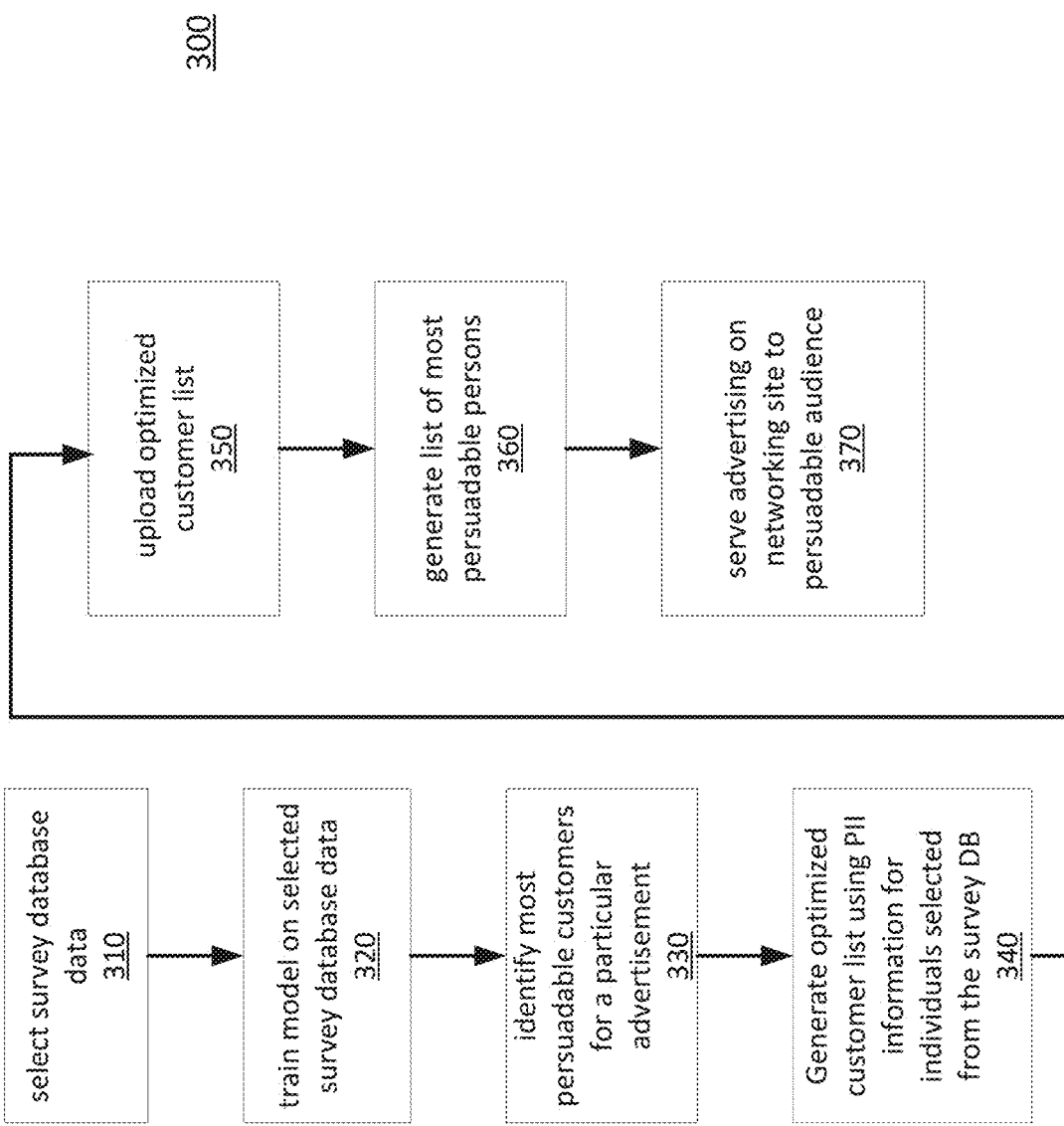
FIG. 3 illustrates an exemplary persuadable audience targeting process, according to one embodiment.

FIG. 3 illustrates an exemplary persuadable audience targeting process 300, according to one embodiment. Audience optimization server 230 selects survey data from survey database 210 that relates to an advertisement (310). Audience optimization server 230 trains a HETE model on the selected survey data (320). Audience optimization server 230 identifies the most persuadable customers from survey database 210 for the particular advertisement based on the HETE model (330).

Audience optimization server 230 generates an optimized customer list using the personally identifiable information for individuals selected from the survey database (340). Audience optimization server 230 uploads the optimized customer list to the networking server 240 (350). According to another embodiment, advertiser server 220 uploads the optimized customer list to the networking server 240. Networking server 240 generates a list of persuadable audience 250 (360) and serves the advertisement on networking site to the persuadable audience 250 (370).

While the present disclosure has been described in terms of particular embodiments and applications, summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A method, comprising:
   selecting survey data from a survey database that relates to an advertisement;
   training a supervised machine learning model to predict heterogeneous treatment effects on the survey data, wherein the model estimates a probability that an individual would be influenced by the advertisement, as determined by unique characteristics of that individual, and rank orders the individuals by treatment effect;
   identifying persuadable customers from the survey database for the advertisement based on the rank ordering;
   generating an optimized customer list using personally identifiable information for the persuadable customers in the survey database; and
   directing the advertisement to a networking website, wherein a subset of users of the networking website will receive the advertisement, and wherein a networking server selects the subset of users, the subset of users sharing characteristics with customers on the optimized customer list.

2. The method of claim 1, wherein the survey data includes answers to one or more questions that are predictive of a user's persuadability.

3. The method of claim 2, wherein the survey data includes one or more of age, gender, political beliefs, and education.

4. The method of claim 1, wherein the survey data results from a survey that shows a survey taker one of the advertisements for targeting or an unrelated advertisement.

5. The method of claim 1, wherein the survey includes a final question that asks if a survey taker is likely to take an action of interest in a predetermined timeframe.

6. The method of claim 5, wherein the survey data and differences in the final question between groups of survey takers predict if the survey takers are persuaded by the advertisement.

7. The method of claim 1, further comprising running a survey experiment on several different treatment groups, each being shown a different advertisement.

8. The method of claim 1, wherein the optimized customer list is rank-ordered by treatment effect.

9. The method of claim 1, further comprising:
   uploading the optimized customer list to the networking website;
   generating a persuadable audience based on the optimized customer list; and
   serving the advertisement to the persuadable audience on the networking website.

10. A non-transitory computer readable medium containing computer-readable instructions stored therein for causing a computer processor to perform operations comprising:
    selecting survey data from a survey database that relates to an advertisement;
    training a supervised machine learning model to predict heterogeneous treatment effects on the survey data, wherein the model estimates a probability that an individual would be influenced by the advertisement, as determined by unique characteristics of that individual, and rank orders the individuals by treatment effect;
    identifying persuadable customers from the survey database for the advertisement based on the rank ordering;
    generating an optimized customer list using personally identifiable information for the persuadable customers in the survey database; and
    directing the advertisement to a networking website, wherein a subset of users of the networking website will receive the advertisement, and wherein a networking server selects the subset of users, the subset of users sharing characteristics with customers on the optimized customer list.

11. The computer readable medium of claim 10, wherein the survey data includes answers to one or more questions that are predictive of persuadability.

12. The computer readable medium of claim 11, wherein the survey data includes one or more of age, gender, political beliefs, and education.

13. The computer readable medium of claim 10, wherein the survey data results from a survey that shows a survey taker one of the advertisements for targeting or an unrelated advertisement.

14. The computer readable medium of claim 10, wherein the survey includes a final question that asks if a survey taker is likely to take an action of interest in a predetermined timeframe.

15. The computer readable medium of claim 14, wherein the survey data and differences in the final question between groups of survey takers predict if the survey takers are persuaded by the advertisement.

16. The computer readable medium of claim 10, further including additional instructions comprising running a survey experiment on several different treatment groups, each being shown a different advertisement.

17. The computer readable medium of claim 10, wherein the optimized customer list is rank-ordered by treatment effect.

18. The computer readable medium of claim 10, further comprising:
    uploading the optimized customer list to the networking website;
    generating a persuadable audience based on the optimized customer list; and
    serving the advertisement to the persuadable audience on the networking website.

* * * * *